(12) United States Patent
Saller

(10) Patent No.: US 7,082,120 B2
(45) Date of Patent: Jul. 25, 2006

(54) METHOD AND COMMUNICATION SYSTEM FOR SETTING UP AN H.323 OR SIP CONNECTION FROM A SOURCE NETWORK TO A CONNECTION DESTINATION WHICH IS EXTERNAL TO THE SOURCE NETWORK

(75) Inventor: Franz Saller, Neuried (DE)

(73) Assignee: Siemens Aktiengesellschaft, Munich (DE)

( * ) Notice: Subject to any disclaimer, the term of this patent is extended or adjusted under 35 U.S.C. 154(b) by 844 days.

(21) Appl. No.: 09/988,245

(22) Filed: Nov. 19, 2001

(65) Prior Publication Data

US 2002/0061014 A1     May 23, 2002

(30) Foreign Application Priority Data

Nov. 17, 2000   (DE) ................. 100 56 949

(51) Int. Cl.
*H04L 12/66* (2006.01)
*H04J 3/12* (2006.01)

(52) U.S. Cl. .................... 370/352; 370/522
(58) Field of Classification Search ........ 370/352–356, 370/522
See application file for complete search history.

(56) References Cited

U.S. PATENT DOCUMENTS

| | | | |
|---|---|---|---|
| 6,339,594 B1 * | 1/2002 | Civanlar et al. | 370/352 |
| 6,385,193 B1 * | 5/2002 | Civanlar et al. | 370/352 |
| 6,584,093 B1 * | 6/2003 | Salama et al. | 370/351 |
| 6,600,735 B1 * | 7/2003 | Iwama et al. | 370/352 |
| 6,707,797 B1 * | 3/2004 | Gardell et al. | 370/260 |
| 6,731,625 B1 * | 5/2004 | Eastep et al. | 370/352 |
| 6,738,390 B1 * | 5/2004 | Xu et al. | 370/467 |
| 6,757,275 B1 * | 6/2004 | Sorrentino | 370/352 |
| 6,829,232 B1 * | 12/2004 | Takeda et al. | 370/352 |
| 2002/0024945 A1 * | 2/2002 | Civanlar et al. | 370/352 |
| 2002/0101860 A1 * | 8/2002 | Thornton et al. | 370/352 |
| 2003/0235187 A1 * | 12/2003 | Iwama et al. | 370/352 |
| 2005/0008005 A1 * | 1/2005 | Li et al. | 370/352 |

FOREIGN PATENT DOCUMENTS

| | | |
|---|---|---|
| DE | 10004811 A1 | 8/2001 |
| EP | 0989705 A2 | 3/2000 |
| EP | 0 999 712 A2 | 5/2000 |

OTHER PUBLICATIONS

Thom, "H.323: The Multimedia Communications Standard for Local Area Networks", IEEE Communications Magazine, Dec. 1996, pp. 52-56.

(Continued)

*Primary Examiner*—Chau Nguyen
*Assistant Examiner*—Hong Sol Cho
(74) *Attorney, Agent, or Firm*—Staas & Halsey LLP

(57) ABSTRACT

An H.323 or SIP connection is set up from a source network (LAN1) via at least one packet-oriented transit network (WAN1, WAN2) to a connection destination (EG2) which is external to the source network. The connection is set up via gateway devices (GW1, . . . , GW4) which are cascaded between networks and respectively manage only access to gateway devices and communication devices which are logically directly adjacent. In this context, H.323 connection setup signaling (SET1, . . . , SET4) is conveyed, using logical address information (030-222) or sections thereof (030, 030-2), from gateway device to gateway device until it reaches the connection destination (EG2).

16 Claims, 1 Drawing Sheet

OTHER PUBLICATIONS

Reid, "Multimedia Conferencing Over ISDN and IP Networks using ITU-T H-Series Recommendations: Architecture, Control and Coordination", Computer Networks 31 (1999); pp. 225-235.

Schulzrinne et al., "Signaling for Internet Technology", Proceedings of the International Conference on Network Protocols, Oct. 1998, pp. 1-27.

* cited by examiner

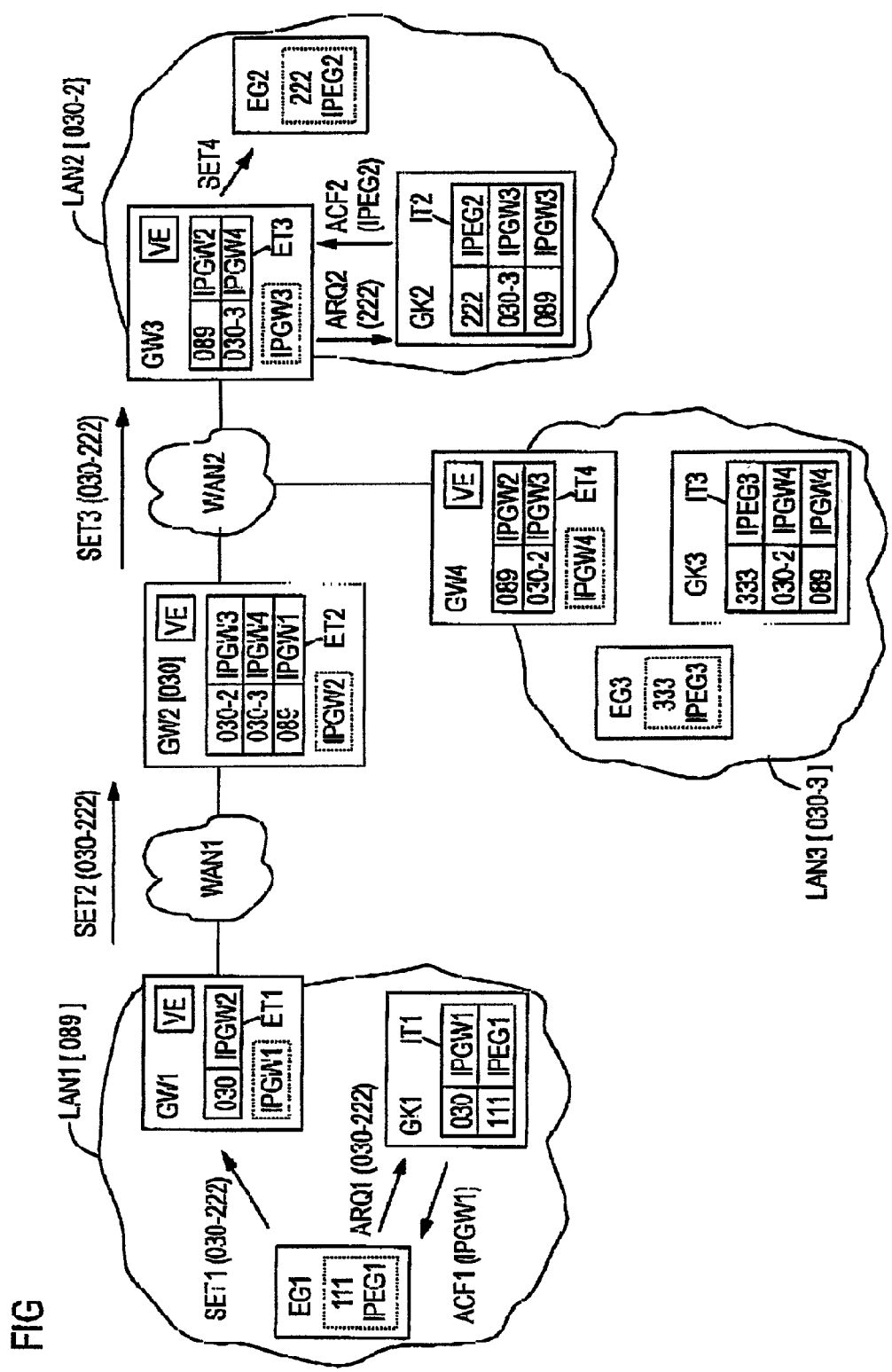

METHOD AND COMMUNICATION SYSTEM FOR SETTING UP AN H.323 OR SIP CONNECTION FROM A SOURCE NETWORK TO A CONNECTION DESTINATION WHICH IS EXTERNAL TO THE SOURCE NETWORK

CROSS REFERENCE TO RELATED APPLICATIONS

This application is based on and hereby claims priority to German Application No. 10056949.8 filed on Nov. 17, 2000 in Germany, the contents of which are hereby incorporated by reference.

BACKGROUND OF THE INVENTION

In contemporary communication systems, connections, e.g. for voice, video or multimedia communication, are increasingly also being routed via packet-oriented communication networks, such as local area networks (LAN) or wide area networks (WAN). This technology forms the basis, for example, for "Internet telephony", which is frequently also referred to as "Voice over Internet Protocol" (VoIP). In such packet-oriented communication networks, data to be transmitted are split into individual data packets provided with a transport address identifying the respective connection destination. This transport address is used to convey the data packets in the communication networks to the respective connection destination largely independently of one another.

At the present time, setup of voice, video or multimedia connections via a packet-oriented communication network is very often based on ITU-T recommendation H.323. The H.323 recommendation describes multimedia connections within a packet-oriented communication network and multimedia connections which are conveyed from a packet-oriented communication network via a gateway device to a circuit-switched communication network, e.g. an ISDN network, and from the latter on to a connection destination. However, such forwarding via a circuit-switched communication network does not use the advantageous infrastructure of existing packet-oriented communication networks, such as the Internet. Although the H.323 recommendation also discloses the practice of setting up H.323 connections from a source network to a destination network via a packet-oriented communication network, such connection setup on the basis of the prior art to date requires signaling between a "gatekeeper" in the source network and a "gatekeeper" in the destination network. Such signaling between various gatekeepers requires a high level of complexity for implementation, however, particularly when there are a plurality of packet-oriented communication networks between the source network and the destination network. In addition, it is necessary for the gatekeeper or the gateway device in the source network to manage and administer the addresses of all potential destination networks. In many cases, this requires an unusually high level of complexity, particularly for H.323 connections routed via the Internet, which can lead to connection destinations distributed all over the world.

Setup of voice, video or multimedia connections is frequently also based on the "SIP protocol" (SIP: Session Initiation Protocol) of the IETF forum (IETF: Internet Engineering Task Force). The SIP protocol also has the imperfections described above, however. The SIP protocol is disclosed, by way of example, in the document RFC 2543:

"SIP: Session Initiation Protocol" by M. Handley, H. Schulzrinne, E. Schooler and J. Rosenberg, March 1999.

SUMMARY OF THE INVENTION

It is an object of the present invention to specify a method and a communication system for setting up an H.323 or SIP connection from a source network via at least one packet-oriented communication network to a connection destination which is external to the source network, where no administration of all potential connection destinations is necessary in the source network.

One aspect of the invention makes it possible to set up H.323 or SIP connections, for example for voice, video and/or multimedia communication, from a source network to a multiplicity of connection destinations which are external to the source network without any great administrative complexity. In this context, the connections are set up via a plurality of cascaded gateway devices, i.e. gateway devices arranged in logical succession, which convey H.323 or SIP connection setup signaling between the source network and the connection destination via at least one packet-oriented transit network. In this case, a gateway device conveys H.323 or SIP connection setup signaling only as far as the respective gateway device which is logically next. It is therefore not necessary for all potential connection destinations to be managed in every such gateway device, but instead only the logically adjacent gateway devices. This considerably reduces the administrative complexity required. In addition, full use can be made of the opportunities for data packet transport in different communication networks routed to the connection destination.

The connection destination external to the source network may, by way of example, be a destination terminal, a destination communication network, a subnetwork or a further gateway device to a further communication network. Otherwise, an H.323 connection and H.323 connection setup signaling are to be understood to mean a connection and connection setup signaling in accordance with ITU-T recommendation H.323. Accordingly, an SIP connection and SIP connection setup signaling are to be understood to mean a connection and connection setup signaling in accordance with the SIP protocol of the IETF forum.

To convey the H.323 or SIP connection setup signaling, a respective gateway device uses logical address information identifying the connection destination or uses a section of said address information to derive a transport address which is used to convey the H.323 or SIP connection setup signaling to the respective gateway device which is logically next.

The logical address information from which the respective transport addresses are derived may comprise, by way of example, a terminal call number, an dialing code, a service number, an email address, an alias address, a "URL" (Uniform Resource Locator) and/or further address information which has become established in one of the application-oriented layers (layers 5–7) of the OSI reference model. The transport addresses may also be provided, by way of example, by "IP addresses" (IP: Internet Protocol) or other addresses valid on the network layer or transport layer of the OSI reference model.

In accordance with one advantageous embodiment of the invention, different gateway devices can derive a respective transport address from different sections of the logical address information. Thus, by way of example, the gateway device closest to the H.323 source network can derive a transport address from a dialing code contained in the logical address information in order to address a gateway device associated with the dialing code in question. The gateway device addressed in this way can then derive a further transport address, e.g. from partial dialing information comprising the dialing code and the first digit of a terminal call number contained in the logical address information, in order thus to address a further gateway device. To support different hierarchies of transit networks and/or conveying gateway devices, the logical address information can be structured and/or subdivided further if appropriate.

In accordance with one advantageous development of the invention, the H.323 or SIP connection setup signaling can transmit a transport address identifying the transmission destination or an interposed gateway device to the source network. This returned transport address can be used over the H.323 or SIP connection to transmit payload data, needing to be transmitted subsequently, on a direct route from the source network to the transmission destination identified by the transport address or to the identified gateway device. In this way, by way of example, one or more gateway devices involved in the H.323 or SIP connection setup signaling can transmit the respectively derived transport address to the source network so that it can be used there for direct transmission of payload data using the transmitted transport address.

In addition, the source network can have an H.323 or SIP gatekeeper for controlling H.323 or SIP connections internal to the source network. In this case, the gateway device in the source network may preferably have a first H.323 or SIP interface to the source network and a second H.323 or SIP interface to the first transit network, the first H.323 or SIP interface being operated in a gatekeeper-controlled H.323 or SIP mode, and, simultaneously therewith, the second H.323 or SIP interface being operated in a gatekeeperless H.323 or SIP mode. In this way, the gateway device conceals the routing of connections to connection destinations which are external to the source network from the H.323 or SIP gatekeeper to a certain extent.

In accordance with another embodiment of the invention, the first transit network may be identical to the second transit network. In this case, the H.323 or SIP connection setup signaling is conveyed from the first gateway device via the first transit network to the second gateway device, which in turn forwards the H.323 or SIP connection setup signaling via the first transit network to the third gateway device. One advantage of such a practice over direct conveyance of the H.323 or SIP connection setup signaling from the first to the third gateway device is that the conveyance work to be done can be distributed over a plurality of gateway devices or hierarchies of gateway devices.

BRIEF DESCRIPTION OF THE DRAWINGS

These and other objects and advantages of the present invention will become more apparent and more readily appreciated from the following description of the preferred embodiments, taken in conjunction with the accompanying drawings of which:

The FIGURE shows a schematic illustration of a communication system, comprising a plurality of local area networks coupled by wide area networks, when an H.323 connection is being set up.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

The FIGURE is a schematic illustration of a communication system comprising a plurality of local area networks LAN1, LAN2 and LAN3 and wide area networks WAN 1 and WAN2. In this case, the local area network LAN 1 is coupled to the wide area network WAN1 via a gateway device GW1, and the wide area network WAN1 is coupled to the wide area network WAN2 via a gateway device GW2. The wide area network WAN2 is also coupled to the local area network LAN2 via a gateway device GW3 and to the local area network LAN3 via a gateway device GW4. The local area networks LAN1, LAN2, LAN3 can thus be coupled to one another by cascading the gateway devices GW1, . . . , GW4 via a plurality of communication networks, in this case WAN1 and WAN2. The wide area networks WAN1 and WAN2 may be provided by the Internet, for example. The local area networks LAN1, LAN2 and LAN3 form a respective "H.323 domain" in accordance with ITU-T recommendation H.323. The gateway devices GW1, GW2, GW3 and GW4 are likewise based on the H.323 recommendation.

In accordance with an alternative embodiment of the invention, the local area networks LAN1, LAN2 and LAN3 and the gateway devices GW1, GW2, GW3 and GW4 may also be operated on the basis of the SIP protocol of the IETF forum.

The local area networks LAN1, LAN2, LAN3 and the wide area networks WAN1, WAN2 respectively support packet-oriented data transport. For the present exemplary embodiment, it may be assumed that data packet transmission in the local area networks LAN1, LAN2, LAN3 and in the wide area networks WAN1, WAN2 is respectively based on the "Internet Protocol" (IP), in which data packets are conveyed by the respective communication network LAN1, LAN2, LAN3, WAN1 or WAN2 using an IP transport address, IP address for short, which is respectively contained in said data packets.

For the present exemplary embodiment, it may also be assumed that the local area network LAN1 is situated in the dialing code area of Munich, having the public dialing code 089, and the local area networks LAN2 and LAN3 and the gateway device GW2 are situated in the dialing code area of Berlin, having the public dialing code 030. Accordingly, the local area network LAN1 has the associated dialing code 089, and the local area networks LAN2 and LAN3 and the gateway device GW2 have the associated dialing code 030.

The local area networks LAN1, LAN2 and LAN3 have a respective terminal EG1, EG2 or EG3 which is logically identified by a respective terminal call number 111, 222 or 333, associated with said terminal, within the local area network LAN1, LAN2 or LAN3 in question. Between networks, the terminals are identified in the normal way by logical address information which comprises the relevant dialing code and the terminal call number and needs to be entered as dialing information in order to set up an H.323 connection between networks. The terminals, EG1, EG2 and EG3 may, by way of example, be in the form of voice, video and/or multimedia terminals and, in particular, personal computers.

For the present exemplary embodiment, it may be assumed that the terminal call numbers of all other terminals (not shown) in the local area network LAN2 also start with the digit 2, and the terminal call numbers of all other terminals (not shown) in the local area network LAN3 also start with the digit 3. Hence, the dialing information which needs to be entered in order to call a terminal in the local area network LAN2 or LAN3 from another network is characterized by partial dialing information 030-2 or 030-3 formed from the dialing code 030 and the first digit 2 or 3 of the terminal call number.

The terminals EG1, EG2 and EG3 also have a respective associated IP address IPEG1, IPEG2 or IPEG3 as the transport address valid in the local area network LAN1, LAN2 or LAN3 in question. The terminal call numbers and IP addresses associated with the terminals EG1, EG2 and EG3 are highlighted in the figure by dotted rectangles.

The gateway devices GW1, GW2, GW3 and GW4 also have a respective associated IP address IPGW1, IPGW2, IPGW3 or IPGW4 which can be used to address the gateway device GW1, GW2, GW3 or GW4 in question in the respectively coupled communication networks. The IP address respectively associated with a gateway device is highlighted in the figure by a respective dotted rectangle. An alternative embodiment may provide for a gateway device GW1, GW2, GW3, GW4 to be addressed in various coupled communication networks using different IP addresses.

The gateway devices GW1, . . . , GW4 have a respective address table ET1, ET2, ET3 or ET4 for setting up H.323 connections between networks. In the address tables ET1, . . . , ET4, cross-network logical address information, in this case dialing codes and partial dialing information, is associated with a respective IP transport address. The IP transport addresses are respectively valid in a coupled communication network routed to the respective connection destination and can address a gateway device, the connection destination or an intermediate destination. The cascading of the gateway devices GW1, . . . , GW4 means that a respective address table ET1, . . . , ET3 or ET4 for a gateway device GW1, . . . , GW3 or GW4 under consideration need have only those gateway devices entered in it whose switching paths provided are directly adjacent to the gateway device under consideration. This considerably reduces the administrative complexity required.

In the present exemplary embodiment, the address table ET1 for the gateway device GW1 contains an association between the dialing code 030 of the dialing code area of Berlin and the IP address IPGW2 of the gateway device GW2 responsible for this dialing code area. Accordingly, the address table ET2 for the gateway device GW2 contains an association between the dialing code 089 of the dialing code area of Munich and the IP address IPGW1 of the gateway device GW1. In addition, the address table ET2 contains an association between the partial dialing information 030-2 characterizing the terminals in the local area network LAN2 and the IP address IPGW3 of the gateway device GW3 in the local area network LAN2, and between the partial dialing information 030-3 characterizing the terminals in the local area network LAN3 and the IP address IPGW4 of the gateway device GW4 in the local area network LAN3. Also, the address table ET3 contains an association between the dialing code 089 and the IP address IPGW2 of the gateway device GW2 forwarding to the dialing code area in question, and between the partial dialing information 030-3 and the IP address IPGW4 of the gateway device GW4. Finally, the address table ET4 contains an association between the dialing code 089 and the IP address IPGW2 of the gateway device GW2 forwarding to the dialing code area in question, and between the partial dialing information 030-2 and the IP address IPGW3 of the gateway device GW3.

The gateway devices GW1, . . . , GW4 also have a respective switching device VE for deriving IP transport addresses from logical address information associated therewith in the address tables ET1, . . . , ET4, and for conveying H.323 connection setup signaling using the derived IP transport addresses.

Besides the gateway devices GW1, . . . , GW4 shown in the figure, any number of other gateway devices, possibly cascaded further, may be coupled to the wide area networks WAN1 and WAN2, said gateway devices being able to convey H.323 connections to further dialing code areas, wide area networks, local area networks, subnetworks and/or terminals.

In accordance with the H.323 recommendation, each of the local area networks LAN1, LAN2, LAN3 is provided with a "gatekeeper" GK1, GK2 and GK3 as connection controller. The gatekeepers GK1, GK2, GK3 are respectively responsible for controlling and managing all the H.323 connections to be set up within the respective H.323 domain LAN1, LAN2 or LAN3. In particular, the gatekeepers GK1, GK2 and GK3 are used in their respective H.323 domain LAN1, LAN2, LAN3 for access control and for address resolution from logical address information into IP transport addresses for the H.323 communication devices in the respective H.323 domain. For address resolution, the gatekeepers GK1, GK2 and GK3 have a respective address table IT1, IT2 or IT3, in which logical address information or sections thereof is or are associated with IP transport addresses valid within the network.

In the present exemplary embodiment, the address tables IT1, IT2 and IT3 contain a respective association between the terminal call number 111, 222 or 333 of the terminal EG1, EG2 or EG3 in the relevant H.323 domain LAN1, LAN2 or LAN3 and the respective IP address IPEG1, IPEG2 or IPEG3 of said terminal. In addition, the gatekeepers GK1, GK2 and GK3 contain a respective record of the gateway device GW1, GW3 or GW4 belonging to the individual H.323 domain LAN1, LAN2 or LAN3. In this case, the gateway device GW1, GW3 or GW4 is recorded under that logical address information which is entered in the address table ET1, ET3 or ET4 for this gateway device GW1, GW3 or GW4. Accordingly, the address table IT1 contains an association between the IP address IPGW1 and the cross-network dialing code 030. In addition, the address table IT2 contains an association between the IP address IPGW3 and, firstly, the dialing code 089 and, secondly, the partial dialing information 030-3. Finally, the address table IT3 contains an association between the IP address IPGW4 of the gateway device GW4 and, firstly, the dialing code 089 and, secondly, the partial dialing information 030-2.

Preferably, the gateway devices GW1, GW3 and GW4 record themselves, for example after a change in their respective address table ET1, ET3 or ET4 or after the system is started, with the respective gatekeeper GK1, GK3 or GK4 under the logical address information entered in their respective address table ET1, ET2 or ET3.

The text below considers setup of an H.323 connection from the terminal EG1 in the local area network LAN1 to the terminal EG2 in the local area network LAN2. Connection setup is initiated on the terminal EG1 by entering dialing information 030-222 comprising the dialing code 030 and the terminal call number 222. In this context, the dialing information 030-222 forms logical address information identifying the destination terminal EG2 between networks.

Within the context of an H.323 connection request, the terminal EG1 transmits an access request message ARQ1 (Admission Request) with the entered dialing information 030-222 to the gatekeeper GK1. The gatekeeper GK1 then searches its address table IT1 for logical address information which matches at least a first section of the transmitted dialing information 030-222. In the present exemplary embodiment, the logical address information under which the gateway device GW1 is recorded with the gatekeeper GK1 matches the transmitted dialing code 030. The gatekeeper GK1 thus ascertains the gateway device GW1 to be the presumed connection destination. Consequently, the gatekeeper GK1 transmits a request confirmation message ACF1 (Admission Confirmation) with the IP address IPGW1 associated with the gateway device GW1 in the address table IT1 to the terminal EG1.

In accordance with alternative embodiments of the H.323 connection setup, instead of the dialing code 030 and the terminal call number 222, the terminal EG1 can transmit, by way of example, an alias address, email address or URL (Uniform Resource Locator) identifying the terminal EG2 to the gatekeeper GK1 as logical address information. Provided that such logical address information has an associated IP transport address in the address table IT1, this IP transport address is transmitted to the terminal EG1 in the request confirmation message ACF1.

Using the transmitted IP address IPGW1, the terminal EG1 transmits an H.323 connection setup message SET1, based on the H.323 recommendation, with the dialing information 030-222 to the gateway device GW1. The switching device VE in the gateway device GW1 then searches the address table ET1 for logical address information which matches at least a first section of the transmitted dialing information 030-222. In the present exemplary embodiment, the dialing code 030 contained in the dialing information 030-222 is found in the address table ET1. In this address table ET1, the dialing code 030 is associated with the IP address IPGW2 of the gateway device GW2, which IP address is valid in the wide area network WAN1, and this association indicates to the gateway device GW1 that the H.323 connection needs to be routed via the wide area network WAN1. Since the fact that its responsibility is limited to the local area network LAN1 means that the gatekeeper GK1 is not able to control forwarding of the H.323 connection, and the gatekeeper GK1 would not authorize connections whose destination address information it is not able to resolve itself, the gateway device GW1 does not send an access request message to the gatekeeper GK1 for routing the H.323 connection. Hence, the gateway device GW1 conceals the routing of the H.323 connection from the gatekeeper GK1 to a certain extent. The gateway device GW1 is thus operated in a gatekeeperless H.323 operating mode in the direction of the wide area network WAN1, and, simultaneously with this, in a gatekeeper-controlled H.323 operating mode in the direction of the local area network LAN1.

Using the IP address IPGW2 associated with the dialing code 030, the gateway device GW1 transmits an H.323 connection setup message SET2 with the dialing code 030 and the terminal call number 222 to the gateway device GW2. The gateway device GW2 recognizes that the sender IP address IPGW1 in the data packets transporting the H.323 connection setup message SET2 is held in its address table ET2 and therefore accepts the H.323 connection. The gateway device GW1 is thereby accepted by the gateway device GW2 as a "trusted gateway". The switching device VE in the gateway device GW2 then searches the address table ET2 for logical address information which matches at least one section of the transmitted dialing information 030-222. In the present exemplary embodiment, the partial dialing information 030-2 contained in the dialing information 030-222 is found in the address table ET2. In this address table ET2, the partial dialing information 030-2 is associated with the IP address IPGW3 of the gateway device GW3, which IP address is valid in the wide area network WAN2. Using this IP address IPGW3, the gateway device GW2 transmits an H.323 connection setup message SET3 with the dialing code 030 and the terminal call number 222 to the gateway device GW3 identified by the IP address IPGW3. The gateway device GW3 recognizes that the sender IP address IPGW2 in the data packets transporting the H.323 connection setup message SET3 is held in its address table ET3, and therefore accepts the H.323 connection.

The gateway device GW3 removes the dialing code 030 from the transmitted dialing information 030-222 and transmits an access request message ARQ2 with the remaining terminal call number 222 to the gatekeeper GK2. The gatekeeper GK2 interprets this as a request for a connection from the gateway device GW3 to a terminal logically identified by the terminal call number 222. Using the address table IT2, the gatekeeper GK2 ascertains that the terminal call number 222 has the IP address IPEG2 of the terminal EG2 associated with it. Consequently, the gatekeeper GK2 transmits a request confirmation message ACF2 with the IP address IPEG2 of the terminal EG2 to the gateway device GW3. Using the transmitted IP address IPEG2, the gateway device GW3 sends an H.323 connection setup message SET4 to the terminal EG2, which sets up a network-internal connection between the gateway device GW3 and the terminal EG2. Finally, this network-internal H.323 connection is used to connect the H.323 connection coming from the terminal EG1 to the terminal EG2.

In this way, a connection is produced between terminals EG1 and EG2 in different H.323 domains LAN1 and LAN2 coupled via a plurality of wide area networks WAN1 and WAN2 without the need for signaling between the respectively responsible gatekeepers GK1 and GK2.

To optimize the transmission of payload data over the H.323 connection between the terminals EG1 and EG2, the gateway device GW3 can also transmit the IP address IPEG2 of the destination terminal EG2 to the calling terminal EG1, for example using means based on ITU-T recommendation H.245 or within IP data packets. The terminal EG1 can then transmit the payload data to be transmitted directly to the destination terminal EG2 within data packets provided with the IP address IPEG2 of the destination terminal EG2. The transmission path for the payload data is thus largely independent of the transmission path for the H.323 connection setup signaling. The payload data can thus be transmitted over any transport networks based on the Internet protocol, such as the Internet, WAN1 and/or WAN2, possibly bypassing the gateway devices GW1, GW2, GW3 used for connection setup. In this context, unrestricted use may be made of route optimization provided in the transport networks.

One aspect of the invention requires no modification of the terminals which are to be connected, which means that any terminals can set up a cross-domain H.323 connection on the basis of the H.323 recommendation using the Internet protocol as transport layer. In this context, logical address information, such as dialing codes, terminal call numbers or sections thereof, which belongs to a different communication layer than the IP transport addresses used is used as access information for gateway devices external to the network which are—at least logically—cascaded between networks. The cascading of the gateway devices means that not every gateway device needs to manage all the potential H.323 connection destinations, but rather only connection destinations, intermediate destinations and gateway devices which are logically directly adjacent.

The invention has been described in detail with particular reference to preferred embodiments thereof and examples, but it will be understood that variations and modifications can be effected within the spirit and scope of the invention.

What is claimed is:

1. A method for setting up an H.323 or SIP connection from a source network to a connection destination which is external to the source network and is identified by logical address information, comprising:

conveying H.323 or SIP connection setup signaling from a first gateway device associated with the source network to a second gateway device via a first transit network;

conveying H.323 or SIP connection setup signaling from the second gateway device to a third gateway device via a second transit network, the third gateway being associated with a communication network which is routed to the connection destination, where the first gateway device uses at least one section of the logical address information to derive a first transport address which identifies the second gateway device in the first transit network the first transport address being used to convey the H.323 or SIP connection setup signaling to the second gateway device, and the second gateway device uses at least one further section of the logical address information to derive a second transport address which identifies the third gateway device in the second transit network, the second transport address being used to convey the H.323 or SIP connection setup signaling to the third gateway device wherein the source network has an H.323 or SIP gatekeeper for controlling H.323 or SIP connections internal to the source network, the first gateway device has a first H.323 or SIP interface to the source network and a second H.323 or SIP interface to the first transit network, and the first H.323 or SIP interface is designed for operation in a gatekeeper-controlled H.323 or SIP mode, and the second H.323 or SIP interface is designed for simultaneous operation in a gatekeeperless H.323 or SIP mode.

2. The method as claimed in claim 1,
wherein the first gateway device derives the first transport address from a different section of the logical address information than used by the second gateway device to derive the second transport address.

3. The method as claimed in claim 2,
wherein the H.323 or SIP connection setup signaling cause a transport address to be transmitted back to the source network, the transport address identifying the transmission destination to the source network, and the result of this is that payload data to be transmitted over the H.323 or SIP connection are transmitted on a direct route from the source network to the transmission destination using the transmitted transport address.

4. The method as claimed in claim 1,
wherein the H.323 or SIP connection setup signaling cause a transport address to be transmitted back to the source network, the transport address identifying the transmission destination to the source network, and the result of this is that payload data to be transmitted over the H.323 or SIP connection are transmitted on a direct route from the source network to the transmission destination using the transmitted transport address.

5. The method of as claimed in claim 1,
wherein the first transit network is identical to the second transit network.

6. The method of as claimed in claim 1,
wherein the logical address information comprises a dialing code, a service number and/or a terminal call number.

7. The method of as claimed claim 1,
wherein the logical address information comprises an email address, an alias address and/or a URL.

8. The method of as claimed in claim 1,
wherein the transport addresses are valid on the network layer of the OSI reference model.

9. A communication system for setting up an H.323 or SIP connection from a source network to a connection destination which is external to the source network and is identified by logical address information, comprising:

a first gateway device for conveying H.323 or SIP connection setup signaling from the source network to a first transit network;

a second gateway device for conveying the H.323 or SIP connection setup signaling from the first transit network to a second transit network; and a third gateway device for conveying the H.323 or SIP connection setup signaling from the second transit network to a communication network which is routed to the connection destination, wherein in the first gateway device, at least one section of the logical address information has an associated transport address identifying the second gateway device to the first transit network, and, in the second gateway device, at least one further section of the logical address information has an associated transport address identifying the third gateway device to the second transit network, and where the gateway devices have a respective switching devices for deriving transport addresses from the logical address information and for conveying H.323 or SIP connection setup signaling using the derived transport addresses wherein the source network has an H.323 or SIP gatekeeper for controlling H.323 or SIP connections internal to the source network, the first gateway device has a first H.323 or SIP interface to the source network and a second H.323 or SIP interface to the first transit network, and the first H.323 or SIP interface is designed for operation in a gatekeeper-controlled H.323 or SIP mode, and the second H.323 or SIP interface is designed for simultaneous operation in a gatekeeperless H.323 or SIP mode.

10. The communication system as claimed in claim 9,
wherein the first transit network is identical to the second transit network.

11. The communication system as claimed in claim 10,
wherein the logical address information comprises a dialing code, a service number and/or a terminal call number.

12. The communication system as claimed claim 11,
wherein the logical address information comprises an email address, an alias address and/or a URL.

13. The communication system as claimed in claim 12,
wherein the transport addresses are valid on the network layer of the OSI reference model.

14. The communication system as claimed in claim 9,
wherein the logical address information comprises a dialing code, a service number and/or a terminal call number.

15. The communication system as claimed claim 9,
wherein the logical address information comprises an email address, an alias address and/or a URL.

16. The communication system as claimed in claim 9,
wherein the transport addresses are valid on the network layer of the OSI reference model.

* * * * *